US011827378B2

(12) United States Patent
Huber et al.

(10) Patent No.: US 11,827,378 B2
(45) Date of Patent: Nov. 28, 2023

(54) LANDING ZONE ARRANGEMENT WITH A PLURALITY OF REMOVABLE SEGMENTS, AND METHOD FOR OPERATING A LANDING ZONE ARRANGEMENT OF THIS KIND

(71) Applicant: KOCH Engineering Gmbh & Co. KG, Mühlhausen i.T. (DE)

(72) Inventors: Martin Huber, Neu-Ulm (DE); Markus Mollweide, Weingarten (DE)

(73) Assignee: KOCH Engineering GmbH & Co. KG, Mühlhausen i.T. (DE)

(*) Notice: Subject to any disclaimer, the term of this patent is extended or adjusted under 35 U.S.C. 154(b) by 0 days.

(21) Appl. No.: 17/794,339

(22) PCT Filed: Jan. 21, 2021

(86) PCT No.: PCT/EP2021/051306
§ 371 (c)(1),
(2) Date: Jul. 21, 2022

(87) PCT Pub. No.: WO2021/148520
PCT Pub. Date: Jul. 29, 2021

(65) Prior Publication Data
US 2023/0126469 A1 Apr. 27, 2023

(30) Foreign Application Priority Data
Jan. 22, 2020 (DE) .................... 10 2020 101 486.4

(51) Int. Cl.
*B64F 1/00* (2006.01)
*B63B 35/50* (2006.01)

(52) U.S. Cl.
CPC .............. *B64F 1/007* (2013.01); *B63B 35/50* (2013.01)

(58) Field of Classification Search
CPC .......... B64F 1/007; B64F 1/222; B63B 35/50; B64U 80/70; B64U 70/00
See application file for complete search history.

(56) References Cited

U.S. PATENT DOCUMENTS 9,187,186 B2 * 11/2015 Besenzoni ................ B64F 1/02
10,093,396 B2 * 10/2018 Besenzoni ............. B63B 35/50
(Continued)

FOREIGN PATENT DOCUMENTS

| CN | 207000837 U | 2/2018 |
| CN | 207389581 U | 5/2018 |

(Continued)

OTHER PUBLICATIONS

International Preliminary Report on Patentability, and Written Opinion of International Search Authority dated Jul. 26, 2022 in PCT/EP2021/051306.

(Continued)

*Primary Examiner* — Medhat Badawi
*Assistant Examiner* — Vicente Rodriguez
(74) *Attorney, Agent, or Firm* — MEDLER FERRO WOODHOUSE & MILLS PLLC

(57) ABSTRACT

A landing zone arrangement is disclosed for aircraft capable of vertical take-off. The arrangement includes a plurality of segments that form a landing zone in an operating state, a storage space for at least partially storing the segments in a stored state, and a base with a rotatable rotor element in order to rotate the segments for transfer between the operating state and the stored state. The landing zone arrangement allows a lighter technical design as the individual segments are removably secured to the rotor element, and a securing unit of the arrangement is designed to fasten the removable segments to the rotor element for transfer into the operating state and to release this fastening for transfer into (Continued)

the stored state. A lifting unit is provided in order to move the removable segments in the direction of the rotor element when transferring into the operating state.

13 Claims, 7 Drawing Sheets

(56) References Cited

U.S. PATENT DOCUMENTS

| | | | |
|---|---|---|---|
| 10,457,420 B2* | 10/2019 | Heinonen | B64U 80/70 |
| 2009/0133613 A1* | 5/2009 | Dunn | B63B 35/50 |
| | | | 114/261 |
| 2010/0200694 A1* | 8/2010 | Tripier-Larivaud | B64F 1/007 |
| | | | 244/114 R |
| 2018/0370652 A1 | 12/2018 | Vebdrame et al. | |

FOREIGN PATENT DOCUMENTS

| | | |
|---|---|---|
| CN | 109866936 A | 6/2019 |
| WO | 9212894 A1 | 8/1992 |

OTHER PUBLICATIONS

Office Action dated May 25, 2023 in Chinese Pat. Appl. No. 2021180009817.3.

* cited by examiner

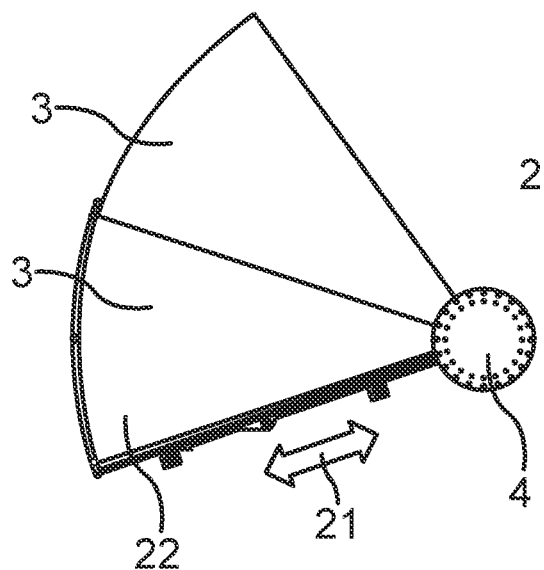
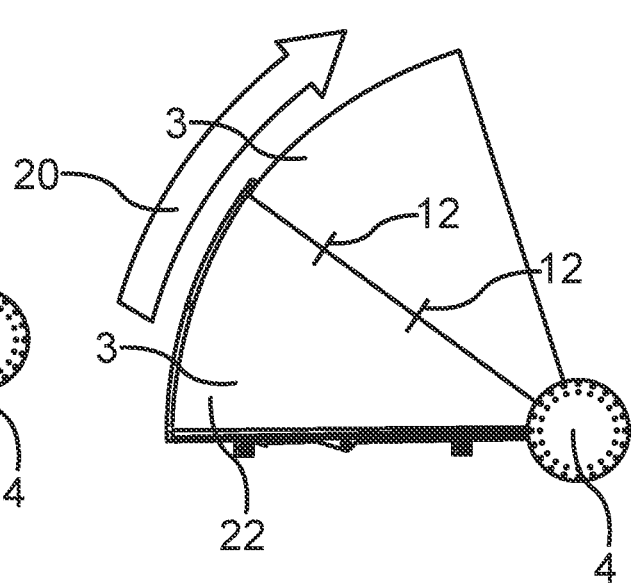
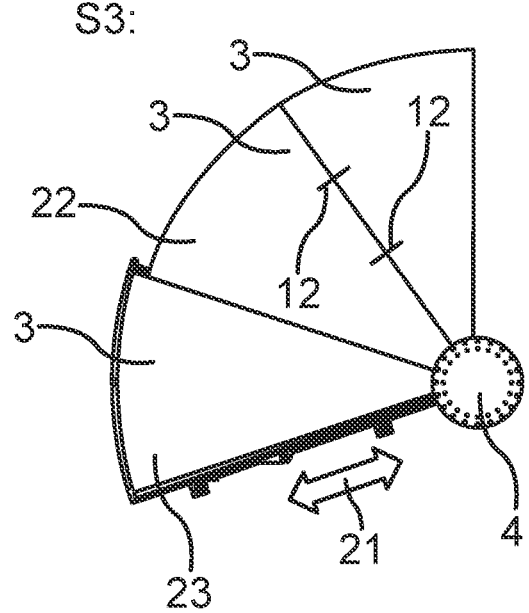
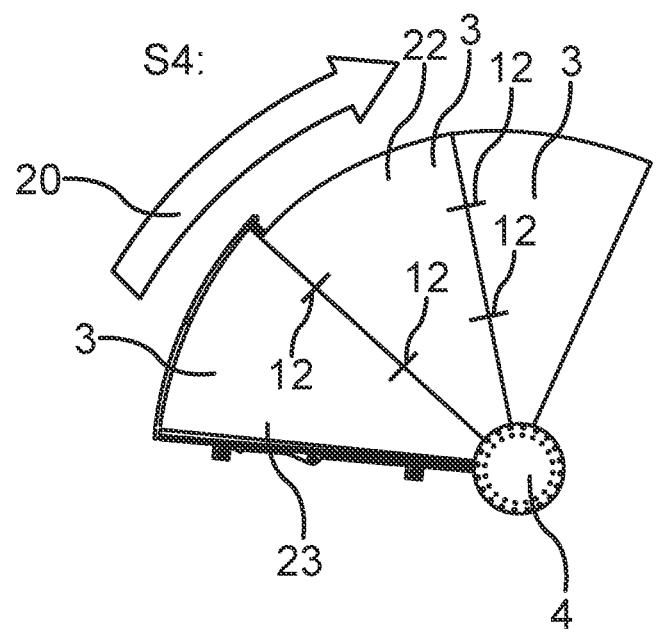
Fig. 3

LANDING ZONE ARRANGEMENT WITH A PLURALITY OF REMOVABLE SEGMENTS, AND METHOD FOR OPERATING A LANDING ZONE ARRANGEMENT OF THIS KIND

FIELD

The invention relates to a landing zone arrangement for aircraft, in particular capable of vertical takeoff, with multiple segments, which together form a landing zone in an operating state, a storage space, in which the multiple segments are at least partially stowable in a stored state, and a base with a rotatable rotor element to rotate the multiple segments for transfer into the operating state and/or into the stored state. In addition, the invention relates to a method for operating such a landing zone arrangement.

BACKGROUND

For landing, aircraft, in particular aircraft capable of vertical takeoff, requires a suitable landing site. On the one hand, it is possible for aircraft capable of vertical takeoff to land on diverse ground also not specifically formed hereto. However, on houses, ships, oil rigs or similar landing targets, the arrangement of a landing platform is usually provided. Such a landing platform can for example be configured round or polygonal. Therein, the landing platform is adapted to the aircraft to land thereon with respect to its size and load capacity. Such a landing platform is substantially characterized by a plane surface, which forms a landing zone for the aircraft.

For example from US 2018/0370652 A1 and from WO 2011/135605 A2, a reduction of such a landing platform by a respective folding mechanism is known when the landing platform is not required.

US 2010/0200694 A1 proposes a landing zone, which allows collapsing as well as storage in or on a mount, on which it is arranged. For example, multiple segments fixedly arranged on a base can be lifted by a cylinder contained in the base and subsequently expanded.

A problem, which the prior art shows, is for example that the height of the individual segments has to be balanced to provide a plane landing zone.

SUMMARY

It is the object of the present invention to provide a landing zone arrangement, which allows an easier technical setup.

According to the invention, this object is solved by the subject matters of the independent claims. Advantageous embodiments with convenient developments are the subject matter of the dependent claims.

The invention is based on a landing zone arrangement for aircraft, in particular capable of vertical takeoff, with multiple segments, which together form a landing zone in an operating state, a storage space, in which the multiple segments are at least partially stowable in a stored state, and a base with a rotatable rotor element to rotate the multiple segments for transfer into the operating state and/or into the stored state.

In order to allow a simple setup as presented above, it is provided according to the invention that at least individual ones of the multiple segments are removably attached to the rotor element and a securing unit of the landing zone arrangement is formed to attach the removable segments to the rotor element in transferring into the operating state and to detach this attachment in transferring into the stored state.

The multiple segments can be formed equally to each other. This allows a simple exchangeability of the individual segments. Alternatively, it can be provided that only individual segments are equal to each other, while other ones of the segments differ from them. Finally, it is also possible that all of the multiple segments are differently shaped. In the operating state, the multiple segments are attached to the rotor element as intended. In this state, the multiple segments form the landing zone. In particular, the landing zone extends around the surface of the rotor element. For example, the surface of the rotor element can be part of the landing zone. In other words, the surface of the rotor element can be a part of the plane surface (in particular with respect to a bird's eye view), which forms the landing zone. Therein, it can be provided that this surface of the rotor element adjoins to each of the multiple segments. In the operating state of the landing zone arrangement, the rotor element can be arranged in a central point and/or center of gravity of the landing zone. In other words, in the operating state, the multiple segments can be arranged around the rotor element such that it forms the central point and/or center of gravity of the landing zone. Therein, the center of gravity can be the geometric center of gravity on the one hand or the center of gravity with respect to the weight distribution on the other hand. Therein, the weight distribution can be calculated by the multiple segments alone or by the multiple segments together with a target aircraft of predetermined size and predetermined weight.

The rotor element is rotatably attached to the base. In other words, at least a part of the rotor element can carry out a rotation with respect to the base. Therein, the base in particular provides the force introduction of forces acting on the rotor element in a ground. The ground or installation site can for example be the floor, a concrete panel, a part of a building, a part of a platform, in particular of a floating platform like an oil rig or the like, or a ship. In particular, the rotational axis of the rotor element, thus, the axis, around which a rotation of the rotor element is allowed or provided, is oriented perpendicular to the extension of the landing zone and/or vertical. Advantageously, the landing zone is oriented horizontal with respect to two different spatial directions. This in particular means that a surface normal of a plane spanned by the landing zone vertically extends. The mentioned surface normal can be parallel to the previously mentioned rotational axis.

The storage space is formed to receive and store, respectively, the multiple segments, while the landing zone arrangement is in the stored state. In other words, the multiple segments are at least partially stowed and received, respectively, or arranged in the storage space in the stored state. It can be provided that all of the removable segments are completely arranged within the storage space in the stored state. In other words, it can be provided that those of the multiple segments, which are removably attached to the rotor element, are completely within the storage space and stowed, respectively, in the stored state. In particular, the storage space is formed to store the multiple segments stacked above each other.

The feature that individual ones of the multiple segments are removably attached to the rotor element, in particular relates to the operating state. In other words, the at least individual ones of the multiple segments are in particular removably attached to the rotor element in the operating state. It can be provided that the at least individual ones of the multiple segments, which are removably attached to the rotor element in the operating state, are stowed in the storage space, while the landing zone arrangement is in the stored state. In this state, the corresponding removable segments are attachable to the rotor element.

The securing unit is formed to attach the removable segments to the rotor element in transferring into the operating state and to detach this attachment in transferring into the stored state. In other words, the securing unit can be formed to establish a detachable connection between the respective segments and the rotor element in transferring into the operating state. Therein, the attachment of the removable segments by the securing unit is in particular individually effected for each individual one of the removable segments. In other words, the securing unit can be formed to perform the attachment of the removable segments in individual manner and preferably one after the other for each of the removable segments. The previously mentioned fact analogously also applies to the detachment of the attachment. In particular, the securing unit is formed to detach the attachment of the removable segments to the rotor element in transferring into the stored state. Therein, the detachment of the attachment is in particular effected separately or individually for each of the removable segments. In other words, the securing unit can be formed to detach the detachable attachment of the removable segments respectively in individual manner and preferably one after the other in transferring into the stored state.

The securing unit can be arranged exclusively at the rotor element or exclusively at the respective segments. However, the securing unit is advantageously arranged partially at the rotor element and partially at each of the multiple segments. In other words, the securing unit can comprise a rotor-side part as well as a segment-side part. For example, the securing unit can comprise screws, an engaging mechanism, ropes or a hoist, hydraulic elements or the like. The removable attachment can for example be effected in force-fit or form-fit manner.

By the landing zone arrangement, it is in particular allowed to stow it in technically simple manner. A further advantage is in that the removable segments are freely arranged in the storage space. In other words, it can be provided that the removable segments do not comprise an attachment to each other and/or an attachment to the storage space and/or an attachment to another part of the landing zone arrangement in the stored state. For example, it is provided that the removable segments are only secured against slipping by their own weight force and/or the shaping of the surrounding storage space. By stowing the multiple segments in the storage space, a loading of the rotor element by the removed segments either is not effected. This is an advantage in particular in case of heavy swell, which can reduce the wear at the landing zone arrangement.

Optionally, the storage space can also be located at a site completely different from the remaining landing zone arrangement. For example, it is also possible that a transport device (for instance a conveyor belt or a transport vehicle) is provided, which is formed to transport the removable segments between the storage space and the rotor unit. Alternatively, it is possible that the storage space is arranged above the landing zone (related to the operating state). In this case, the segments are lowered for docking to the rotor element. This is in particular reasonable if sufficient installation space is not available below the landing zone.

The landing zone arrangement comprises a lifting unit, which comprises one or more lifting elements arranged in or at the storage space, to move the removable segments towards the rotor element in transferring into the operating state. Herein, towards the rotor element means that the movement can comprise both vertical and horizontal direction components. In particular, the lifting element or elements are arranged in the area of sidewalls of the storage space. The sidewalls can additionally perform a function as a housing cover for protection against external influences as well as furthermore increase the strength of the landing zone arrangement in addition to the base. The top-side cover of the housing in the retracted state is effected via the uppermost segment. The storage space or the housing of the lifting unit further satisfies a protective function against horizontal, unintended movements of the segments due to external influences. Optionally, the lifting elements for example each engage with the storage space from the outside with one arm.

The lifting elements can substantially have an extension in vertical direction. The lifting unit and the lifting elements thereof, respectively, can have one or more degrees of freedom with respect to their movement. The lifting unit and the lifting elements thereof, respectively, at least have a degree of freedom in vertical direction, optionally also in horizontal or radial direction. The lifting elements can each comprise a hydraulic, electrical, pneumatic and/or alternative actuator. Additionally, a position determination of individual segments can be effected by suitable sensor technology in the lifting elements or at the storage space. In this manner, the lifting unit allows a preferably synchronized lifting and lowering of the removable segments located within the storage space as well as optionally a real-time survey of the segments. The movement of the removable segments towards the rotor element is in particular effected by lifting the removable segments. Herein, the leading elevating element can be the lowermost segment, which is fixedly connected to the lifting element and lifts all of the further segments e.g. supported by means of floating bearing. Analogously, the lifting elements and the lifting unit, respectively, can also be configured for transfer from the operating state into the stored state in that the lifting unit and the lifting elements, respectively, lower the removable segments into the storage space after detaching the attachment thereof to the rotor element. For example, the lifting unit comprises four lifting elements. The number of the lifting elements can turn out greater or smaller as needed.

The lifting elements can be arranged within or outside of the storage space at two or more different locations. Alternatively, one or more of the lifting elements can each be arranged on respectively opposing sidewalls of the segment. However, this is to be purely exemplarily understood, each reasonable arrangement of lifting elements is of course possible. For example, the lifting unit forms an at least vertically displaceable storage plane, on which the removable segments are stowable. A vertical movement executable thereby can additionally be supplemented by one or more horizontal and/or vertical movements (optionally also combined). The transfer into the operating state is then effected in that all of the removable segments located on the lifting unit are lifted and optionally additionally horizontally, in particular radially, moved. Hereby, a particularly simple movability of the removable segments is overall ensured.

According to a development, it is provided that the rotor element is immovable in relation to the storage space parallel to its rotational axis, in particular in vertical direction. In other words, the rotor element can be immovable in relation to the storage space, in particular in vertical direction. However, it can differently be provided that the base comprises a hydraulic compensating mechanism, which retains the landing zone in the horizontal even upon movements of the base (for instance by swell on a ship). For example, it can also be provided to lower the landing zone onto fixed supports (at the installation site) to dissipate loads. However, a movement of the rotor element parallel to its rotational axis, thus in particular in vertical direction, is not possible. In this manner, a particularly simple configuration of the rotor element arises.

According to a development, it is provided that the securing unit comprises at least one pocket for receiving the removable segments at the rotor element. In other words, the rotor element can be shaped according to at least one pocket, wherein a respective opening of the pocket or pockets preferably points outwards in radial direction with respect to the rotational axis. The at least one pocket is formed for receiving the removable segments. Therein, it can be provided that a respective pocket is provided for each of the removable segments or that a pocket is formed for receiving multiple removable segments. By receiving the removable segments in the pocket, the removable attachment of the removable segments to the rotor element can be at least partially provided. This in particular means that further attaching means can be provided in addition to the pocket. The pocket can be construed as a part of the securing unit by its function. By such a pocket for inserting, a particularly simple and stable configuration of the securing unit arises.

According to a development, it is provided that the segments comprise respective locking means to detachably connect the multiple segments to each other in the operating state. In other words, the segments can have a connection to each other in the operating state. In particular, locking means are provided on sidewalls of two adjacent removable segments extending parallel. In this manner, the corresponding segments can be connected to each other for increasing the stability of the landing zone. Particularly preferably, it is provided that corresponding locking means are provided circumferentially at each interface between two segments in circumferential direction. Therein, the locking means can each have the same distance from the rotational axis. Multiple such attaching rings can also be provided at different distances or different radius around the rotational axis. In this manner, a particularly advantageous stability of the segments and the landing zone, respectively, arises. In addition, the attachment of the removable segments to the rotor element can be relieved.

According to a development, it is provided that exactly one of the multiple segments is fixedly arranged at the rotor element. This exactly one segment fixedly arranged at the rotor element can serve as a start point for attaching the removable segments in transferring into the operating state. In transferring into the operating state, the attachment of the multiple segments can in particular be provided one after the other beginning with a removable segment adjacent to the fixed segment. Thereby, an improved stability both during transfer into the operating state and while the operating state is already taken results because the fixed segment can be arranged at the rotor unit with higher stability.

According to a development, it is provided that the segment fixedly arranged at the rotor element is configured larger than the removable segments and/or is formed to cover the storage space, in particular in water-proof manner. In other words, the segment fixedly arranged at the rotor element then serves as a lid or cover of the storage space in the stored state. Hereby, the remaining, removable segments can be protected from weather effects.

According to a development, it is provided that support arms are arranged at the base to support the landing zone. Advantageously, the support arms can each be pivotably or rotatably arranged at the base. Herein, the support arms in particular have a respective rotational axis, which is at least substantially parallel to the rotational axis of the rotor element. In particular, the respective rotational axis of the support arms is provided between the respective support arm and the base. In this manner, the movement of the support arms can be ensured. Alternatively or additionally to the rotation around the rotational axis, the support arms can have a length variation as a degree of freedom. Hereto, the support arms for example comprise a telescopic extension or a telescopic mechanism for varying their length. In this case, the support arms can also be referred to as telescopic arms. In particular, it is provided that the support arms are spread from the base in the operating state. Alternatively or additionally, it can be provided that the support arms are extended to a larger length in the operating state than in the stored state. For example, it can be provided that the support arms are transferred into a space-saving position as intended in the stored state. This can be effected by pivoting and/or retracting the support arms. For example, it can be provided that the support arms are formed to pivot into the storage space in the stored state. In this manner, the support arms or at least a part of the support arms can be stowable in the storage space. An additional stability of the landing zone arrangement and of the landing zone, respectively, is ensured by the support arms. In addition, weight can be saved by a higher extent of stability and reduced material thicknesses resulting from it.

According to a development, it is provided that the support arms comprise a vertically extendable support element at their end facing away from the base. Advantageously, the support arms are designed at least substantially elongated, wherein a respective support arm is arranged at the base with its one end and the respectively other end is the end facing away from the base. The vertically extendable support element is formed to move obliquely or vertically upwards to exert a supporting force on individual ones of the segments and/or the landing zone or to compensate for a height difference in other manner in the operating state. The support arms as well as the vertically extendable support elements can substantially be designed analogously to the extendable and/or fold-out supports of a truck crane. However, corresponding support arms are to be modified therein such that they cannot develop their supporting force downwards but upwards. This can be achieved in that the respective vertically extendable support elements are upwards extendable (and not downwards as in the example of the truck crane). Overall, the extendable support arms result in a simple possibility of supporting the segments and the landing zone, respectively, where it is not possible via the ground or installation site (building, hull of a ship etc.). In addition, it is advantageous that both extension of the support arms and extension of the vertically extendable support elements can be hydraulically operable. In this case, synergies in providing the hydraulic drive arise. However, it is alternatively also possible to operate the support arms and/or the vertically extendable support elements in electromotive manner or in any other manner.

According to a development, it is provided that at least one of the support arms forms a lateral surface of the storage space and/or seals it, in particular in water-proof manner, in the stored state. In other words, it can be provided that the corresponding lateral surface of the storage space is provided and/or sealed by one or more of the support arms in the stored state. In this manner, high movability of the support arms can be ensured on the one hand and a high efficiency of the landing zone arrangement in particular with respect to lightweight construction can be ensured on the other hand. In addition, it is ensured that the interior of the storage space is protected from weather effects.

According to a development, it is provided that the multiple segments are at least substantially shaped according to a circular sector or a triangle. In this manner, a circular and/or an n-cornered landing zone arises, wherein n can represent the number of the segments. Therein, the shape of the segments can slightly deviate from the mentioned shape in the area, in which they are arranged at the rotor element. This is due to the fact that the shaping is adapted to the requirement of the capability of attachment to the rotor element in this area. However, each other shaping of the segments is also conceivable. However, the multiple segments are advantageously shaped such that a surface as homogeneous as possible results as the landing zone.

A second aspect of the invention relates to a method for operating a landing zone arrangement with the following steps for transferring the landing zone arrangement from a stored state into an operating state:

Moving multiple removable segments stored in a storage space of the landing zone arrangement towards a rotor element of the landing zone arrangement by means of a lifting unit, which comprises one or more lifting elements arranged in or at the storage space, attaching multiple removable segments stored in the storage space of the landing zone arrangement to the rotor element of the landing zone arrangement, and expanding the multiple segments by rotating the rotor element, and/or with the following steps for transferring the landing zone arrangement from the operating state into the stored state:

collapsing the multiple segments by rotating the rotor element, and detaching the attachment of the removable segments and subsequently displacing the segments by means of the lifting unit into the storage space of the landing zone arrangement.

Therein, the method is in particular to be understood to the claimed landing zone arrangement, which is described within the scope of the entire application. Accordingly, features as well as the advantages thereof also apply to the method in analogous manner. The same also analogously applies vice versa, features as well as advantages described with reference to the method accordingly also apply to the landing zone arrangement according to the invention.

According to a development, it is provided that the attachment of the multiple segments is each effected individually one after the other and the rotor element is rotated by a predetermined angle before attaching a segment to be subsequently attached. In other words, the steps of attaching and expanding can each be performed in iterating or alternating manner. After attaching one of the removable segments to the rotor element, expanding is effected by rotating by the predetermined angle before the next segment is attached. This iterating or alternating performance of the method steps of attaching and expanding can be performed until all of the removable segments are attached to the rotor element. In transferring the landing zone arrangement into the stored state, this analogously applies in reverse. In this case, the attachment of the removable segments can be individually effected one after the other, wherein rotating by the predetermined angle is effected between detachment of the attachment of two adjacent segments. Therein, the rotation can be effected in co-rotating or counter-rotating manner in transfer into the stored state with respect to the transfer into the operating state.

The landing zone arrangement can comprise a control unit, which controls the attachment and expansion and/or collapse as well as the detachment of the attachment. Accordingly, the control unit can be formed to command the attachment of the multiple segments respectively successively effected. Alternatively or additionally, the control unit can command that the rotor element is rotated by the predetermined angle before attaching the segment to be subsequently attached. In other words, the control unit can be formed such that it controls the alternating rotation and expansion and attachment, respectively, of the segments, in particular in the sense mentioned above. In analogous manner, the control unit can be formed to control the collapse as well as the detachment of the attachment in alternating or iterating manner.

The control unit can be mechanically or preferably electronically designed. For example, the control unit can be designed as a microprocessor, programmable logic gate (FPGA) or as a digital signal processor. Accordingly, the landing zone arrangement can include an analog or digital control unit, which is formed to perform or control the method according to the invention. In case of a digital control unit, it can comprise a memory, on which an executable program code is stored, which entails performing the corresponding method steps upon execution of the program code in the control unit.

BRIEF DESCRIPTION OF DRAWINGS

FIG. 3 depicts multiple steps for transferring the landing zone arrangement into an operating state in a schematic perspective view.

DETAILED DESCRIPTION

Figure 1:
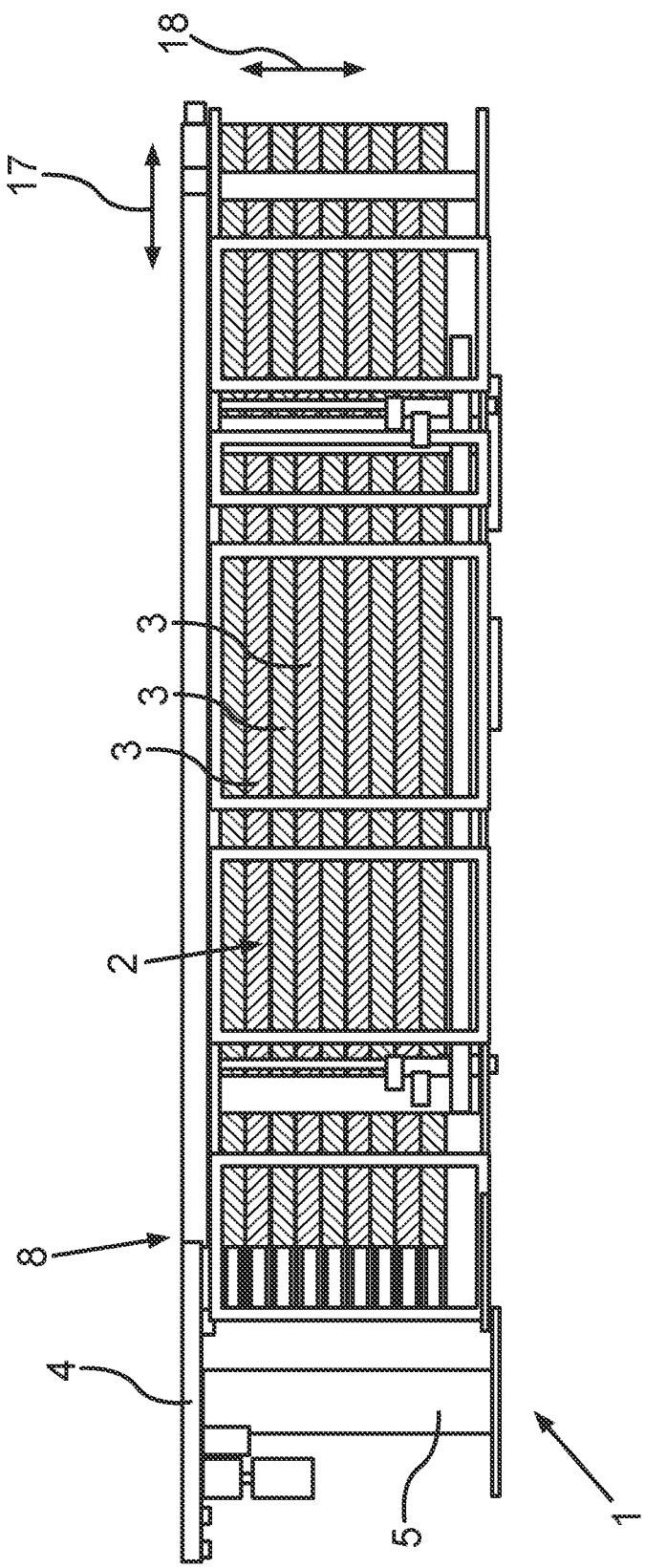
FIG. 1 depicts a landing zone arrangement for aircraft, in particular capable of vertical takeoff, with multiple segments, which are stowed in a storage space in a stored state, in a schematic sectional view.
Figure 2:
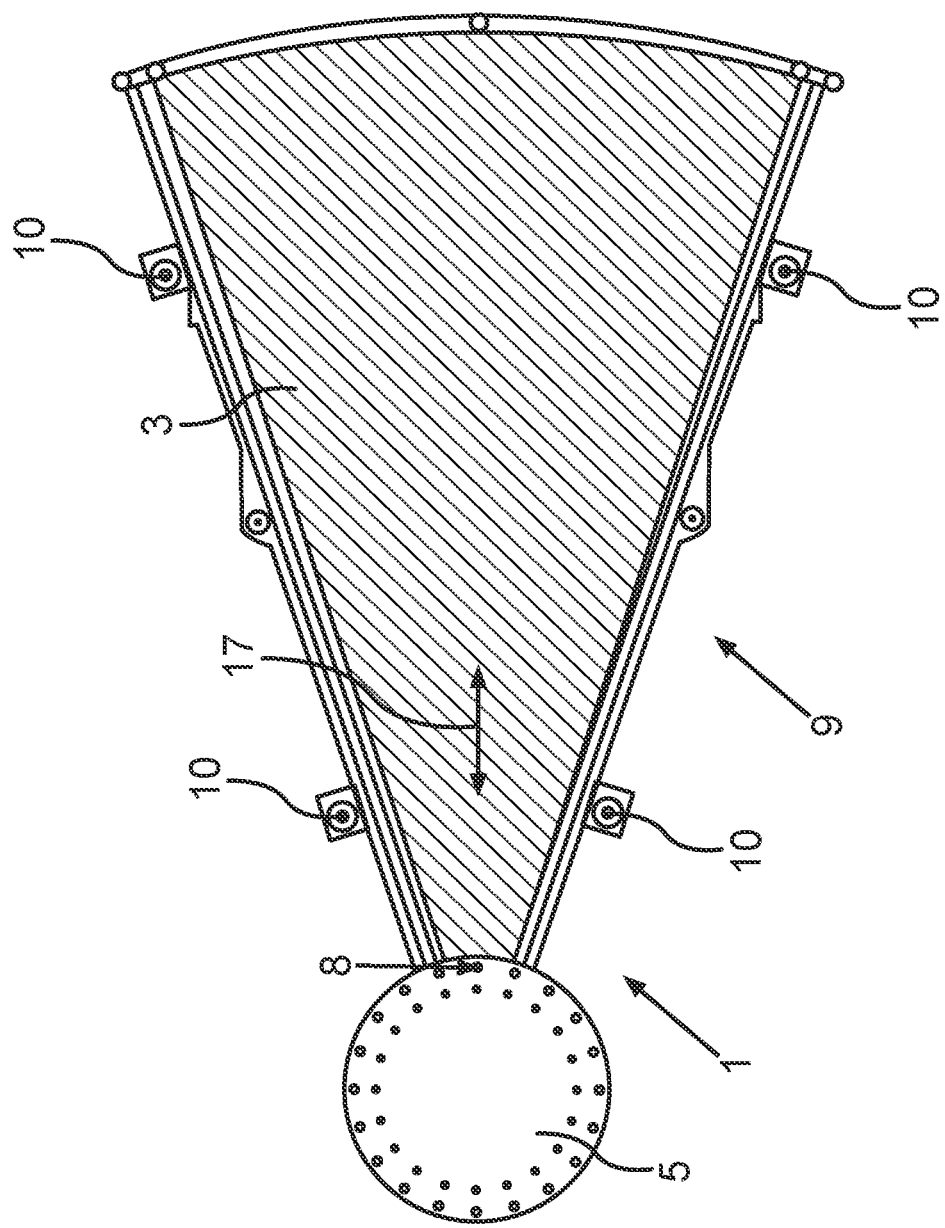
FIG. 2 depicts the same landing zone arrangement in the stored state in a schematic top view.

FIGS. 1 and 2 show a landing zone arrangement 1 for providing a landing zone 11 for aircraft 19, in particular aircraft 19 capable of vertical takeoff. The landing zone 11 is in particular an at least substantially plane surface, which allows landing of the stored state. In particular, the landing zone arrangement 1 and the landing zone 11, respectively, are formed with respect to size and/or load-bearing capacity to be able to support a helicopter. In other words, the landing zone arrangement 1 and the landing zone 11, respectively, are formed to allow landing of a helicopter on the landing zone 11.

In order to allow a space-saving arrangement and installation, respectively, of the landing zone arrangement 1 at an installation site, for example a ship, a floating platform (for example an oil rig), a building or the like, it is provided that the landing zone arrangement 1 has an operating state and a stored state. Therein, a space requirement of the landing zone arrangement 1 in the stored state is considerably reduced compared to the operating state. Hereto, the landing zone arrangement 1 and the landing zone 11, respectively, are divided into multiple segments 3. In other words, the segments 3 form the landing zone 11 in the operating state of the landing zone arrangement 1. In still other words, the individual segments 3 are composed to an at least substantially plane surface in the operating state, wherein this surface forms the landing zone 11. The landing zone 11 is for example apparent based on FIGS. 5 and 7.

Now again with reference to FIGS. 1 and 2, the segments 3 are at least partially stowable in a storage space 2 of the landing zone arrangement 1 in the stored state. In particular, the multiple segments 3 are stowed or arranged in the storage space 2 as intended in the stored state. This is in particular apparent based on FIG. 1. The storage space 2 is laterally bounded by respective lateral surfaces 6.

These multiple segments 3 can be formed equally to each other or differently from each other. In other embodiments, it can for example be provided that all of the multiple segments 3 are identical. Presently, it is provided that one of the multiple segments 3 differs from the remaining, equal segments 3. This is further explained in the following.

A rotor element 4 is arranged at a base 5 of the landing zone arrangement 1. The rotor element 4 is rotatably arranged at the base 5. Hereto, the rotor element 4 can comprise an electric motor, hydraulic drive or any other drive. Therein, the rotor element 4 presently has a vertically oriented rotational axis. In other words, the rotor element 4 can rotate within a horizontal plane. In particular, the rotor element 4 can rotate within the plane, which is spanned by the landing zone 11 in the operating state of the landing zone arrangement 1. The rotor element 4 is formed to transfer the multiple segments 3 into the operating state and/or into the stored state. Hereto, the rotor element 4 moves the corresponding segments 3 with its rotational movement.

The landing zone arrangement 1 comprises a securing unit 8, which is formed to attach the segments 3 to the rotor element 4 and/or to detach the attachment. In particular, the securing unit 8 is formed to attach the segments 3 to the rotor element 4 in transferring into the operating state and to detach this attachment in transferring into the stored state. In other words, the at least individual ones of the multiple segments 3 are removably attached to the rotor element 4. In other words, the at least individual ones of the multiple segments 3 are reversibly attachable to the rotor element 4. These segments 3 are also referred to as removable segments 3. In other embodiments, it can be provided that all of the segments 3 are removable. In the present embodiment, it is provided that one of the multiple segments 3 is fixedly arranged at the rotor element 4 and the remaining segments 3 are removably designed. Therein, the removable segments 3 are presently preferably each designed identically to each other. In this manner, they are particularly easily exchangeable and/or replaceable. The single segment from the multiple segments 3, which differs from the remaining segments 3, is in particular the segment fixedly arranged at the rotor element 4 (see below the cover segment 16). This differing segment 3 can in particular be designed larger than the removable segments. Preferably, the segment 3 fixedly arranged at the rotor element 4 is formed to cover the storage space 2.

FIG. 3 now shows the transfer of the landing zone arrangement 1 from the stored state into the operating state in sections based on multiple steps S1 to S4. In step S1, a segment 22 is removably attached to the rotor element 4. In the present example, this is in particular effected via a corresponding pocket or recess, which the rotor element 4 comprises for the removable segments 3. Thus, this pocket or recess is a part of the securing unit 8 in the present example. Corresponding to a hook-in movement 21, which is in particular effected within the plane spanned by the landing zone 11, the segment 22 is hooked or introduced into this pocket or recess. Subsequently, further fixing of the segment 22 can be effected by corresponding securing elements of the securing unit 8. These securing elements can be arranged at the rotor element 4 and/or the respective segment 3 and 22, respectively.

After attaching the segment 22 to the rotor element 4 in step S1, the rotor element 4 is rotated by a predetermined angle in the following step S2. This is indicated by an arrow 20 in FIG. 3. In addition, the segment 22 is locked to the adjacent segment 3 in step S2. Hereto, the segments 3 comprise respective locking means 12. Thus, a particularly stable attachment of each of the segments 3 or concretely of the segment 22 in the present example is ensured. The predetermined angle, by which the rotation 20 is effected, in particular corresponds to an angular range covered by the segment 22 and by the respective segments 3, respectively. Sense and purpose of the rotation 20 is in that a following segment 23 can subsequently be attached to the rotor element 4. This is effected in the following step S3. By a lifting unit 9, which includes four lifting elements 10 in the present example, the following segment 23 is lifted out of the storage space e.g. along a vertical direction of movement 18 (see also FIGS. 1 and 2). The lifting unit 9 and the lifting elements 10 thereof, respectively, can for example comprise an electric drive, in particular electric motor, a hydraulic drive or any other drive or actuator. The four lifting elements 10 are formed to commonly lift the segments 3 stored in the storage space in synchronized manner. Subsequently, the following segment 23 can also be inserted into the rotor element 4 with the hook-in movement 21 in horizontal or radial direction of movement 17 (see FIGS. 1 and 2). This movement too in horizontal direction of movement 17 can be effected by means of the lifting unit 9. The attachment can be effected analogously to the attachment of the segment 22. Alternatively, the segment 23 can be attached via the lifting elements 10 and be retained in the position.

In a subsequent step S4, the rotation 20 by the predetermined angle is again effected. Analogously to the step S2, the locking of the locking means 12 is effected in step S4. The following segment 23 is attached or locked to the segment 22 by means of the locking means 12.

By rotating 20 or expanding by means of the rotor element 4, the segments 3 stowed or arranged within the storage space 2 in stacked manner can be arranged next to each other at the rotor element 4 in transferring into the operating state. Therein, the rotation 20 in particular pursues the purpose to open an opening of the storage space 2 to the top for removing the respectively following segment 3. In this manner, lifting out and arranging a following segment 3 are allowed.

For controlling these method steps, a control unit 15 can be provided at the landing zone arrangement 1. For example, the control unit 15 can be formed to control the attachment and the expansion and/or collapse as well as detachment of the attachment. Accordingly, the control unit 15 can be formed to command the attachment of the multiple segments 3 each effected one after the other. Alternatively or additionally, the control unit can command that the rotor element is rotated by the predetermined angle before attaching the segment to be subsequently attached. In other words, the control unit 15 can be formed such that it controls the alternating rotation and expansion and attachment, respectively, of the segments 3, in particular in the sense mentioned above. In analogous manner, the control unit 15 can be formed to control the collapse as well as the detachment of the attachment in alternating or iterating manner.

The control unit 15 can be mechanically or preferably electronically designed. For example, the control unit 15 can be designed as a microprocessor, programmable logic gate (FPGA) or as a digital signal processor. Accordingly, the landing zone arrangement 1 can include an analog or digital control unit 15, which is formed to perform or control the method according to the invention. In case of a digital control unit 15, it can comprise a memory, on which an executable program code is stored, which entails performing the corresponding method steps upon execution of the program code in the control unit 15.

Figure 4:
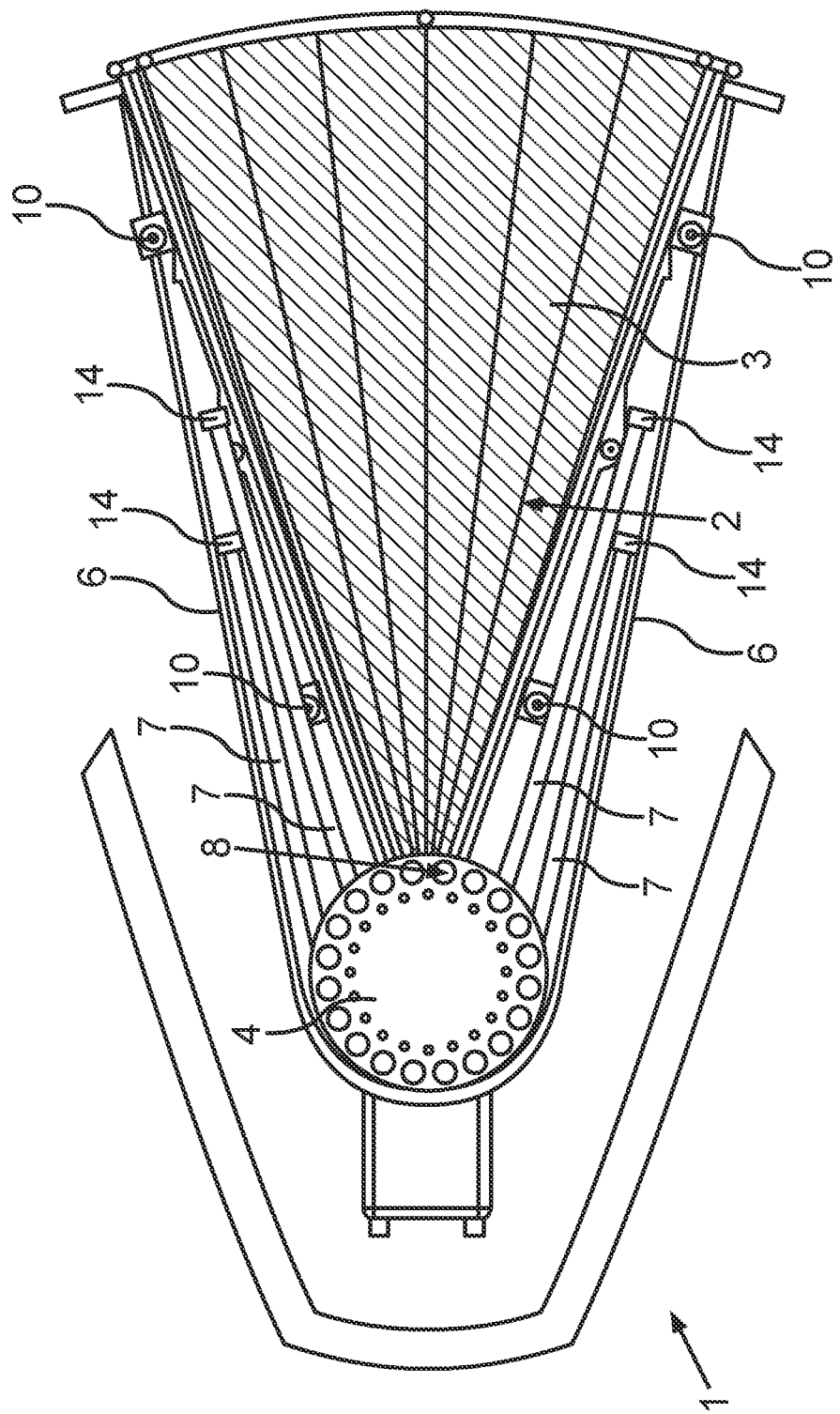
FIG. 4 depicts again the landing zone arrangement in the stored state in a schematic top view.

FIG. 4 additionally shows multiple support arms 7 in the stored state. These support arms 7 are arranged at the base 5 or the rotor element 4 with a first end. The support arms 7 comprise a respective vertically extendable support element 14 at the opposing end. In particular, the support arms 7 are pivotably arranged at the base 5. In the stored state, the support arms 7 (just as the segments 3) can be stowed within the storage space 2.

Figure 5:
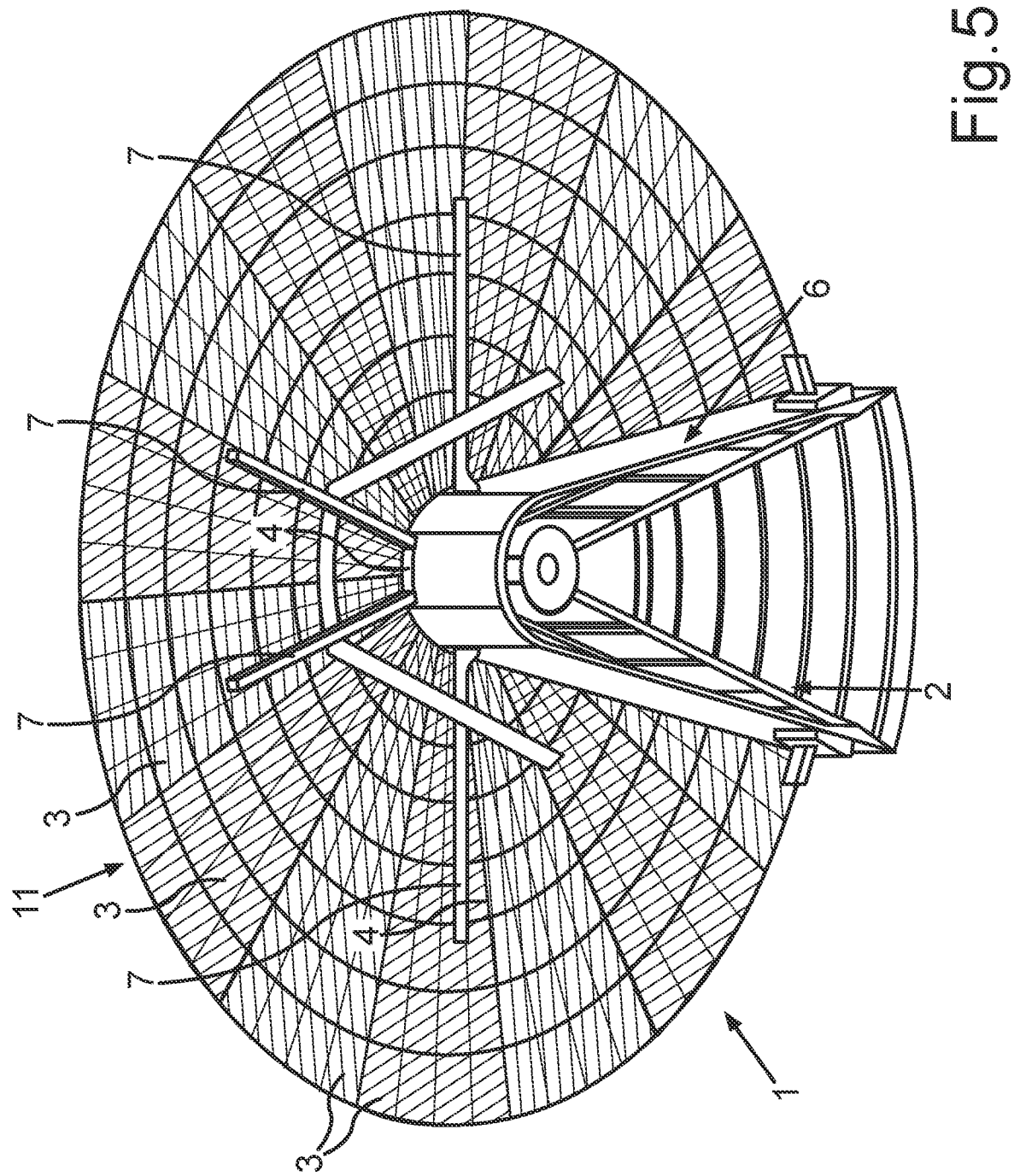
FIG. 5 depicts the landing zone arrangement in a schematic perspective view on the bottom side thereof in a schematic perspective view.

FIG. 5 shows the landing zone arrangement 1 in the operating state. On the top side of the landing zone arrangement 1, there is the landing zone 11. In FIG. 5, it is apparent by the upwards directed perspective how the landing zone 11 and the segments 3, respectively, are supported from below by the support arms 7. In other words, the support arms 7 are formed to support the landing zone 11 and individual segments 3, respectively, from below. Hereto, the support arms 7 can be pivoted such that they are transferred into a respective operating position. For example, the support arms 7 take their respective operating position in the operating state, in which the respective support arms 7 are spread from the base 5 and the rotor element 4, respectively. Therein, the support arms 7 can extend in their main extension direction in radial direction related to the rotor element 4 and the base 5, respectively. In addition to pivoting the support arms 7, it can be provided that they vary their respective length. For example, the support arms 7 can be designed as telescopic arms. In this case, the support arms 7 can increase their length in the operating state with respect to the stored state. In this manner, an even more efficient support of the landing zone 11 in a position located radially farther outwards is possible. For example, the respective extendable support element 14 is extended at the respective end facing away from the base 5 in the operating state such that a predetermined pressure is generated on the bottom side of the landing zone 11 and on the bottom side of one or more segments 3, respectively. This pressure is directed upwards and generates the supporting force.

Figure 6:
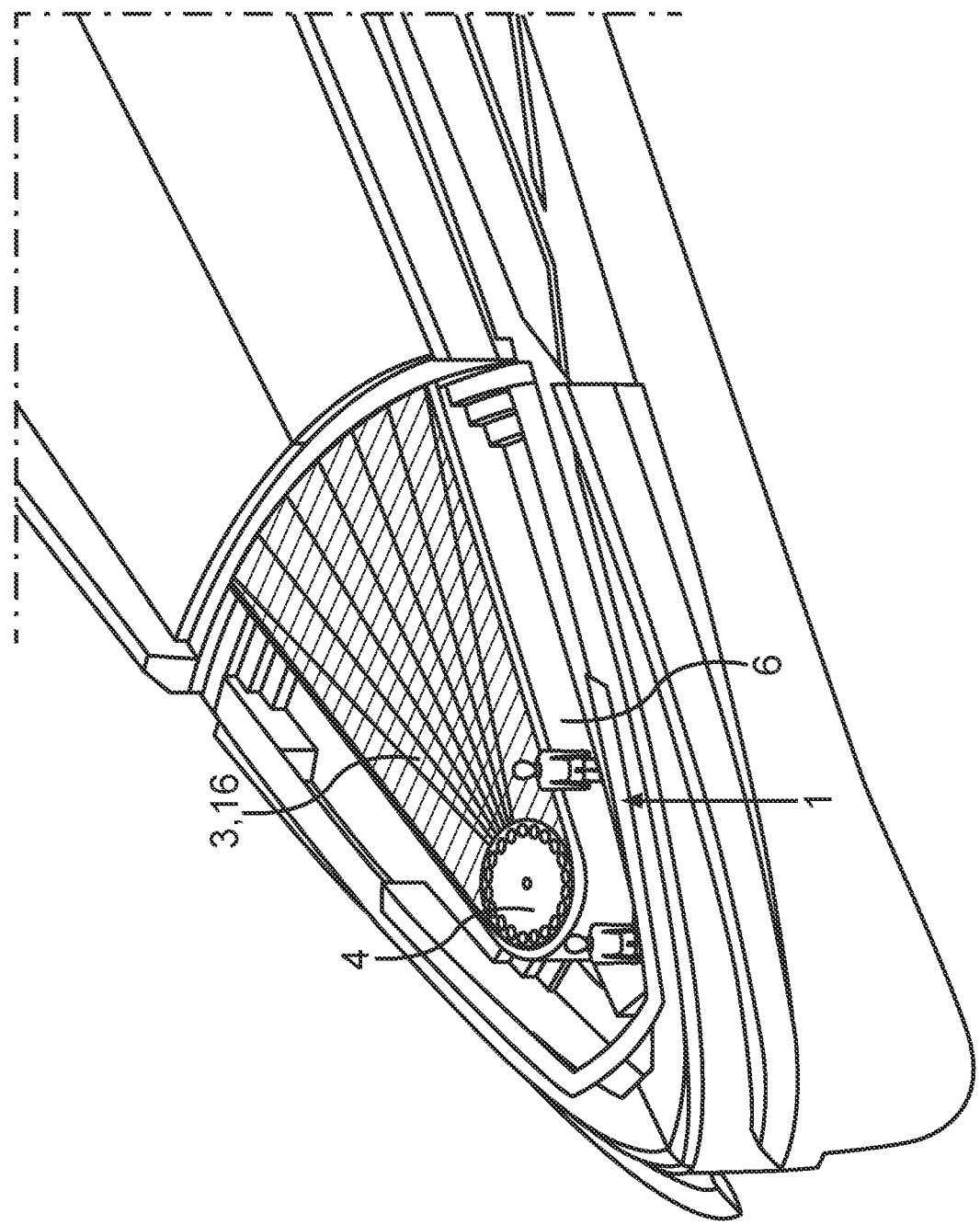
FIG. 6 depicts a landing zone arrangement exemplarily installed on a ship in the stored state in a schematic perspective view.
Figure 7:
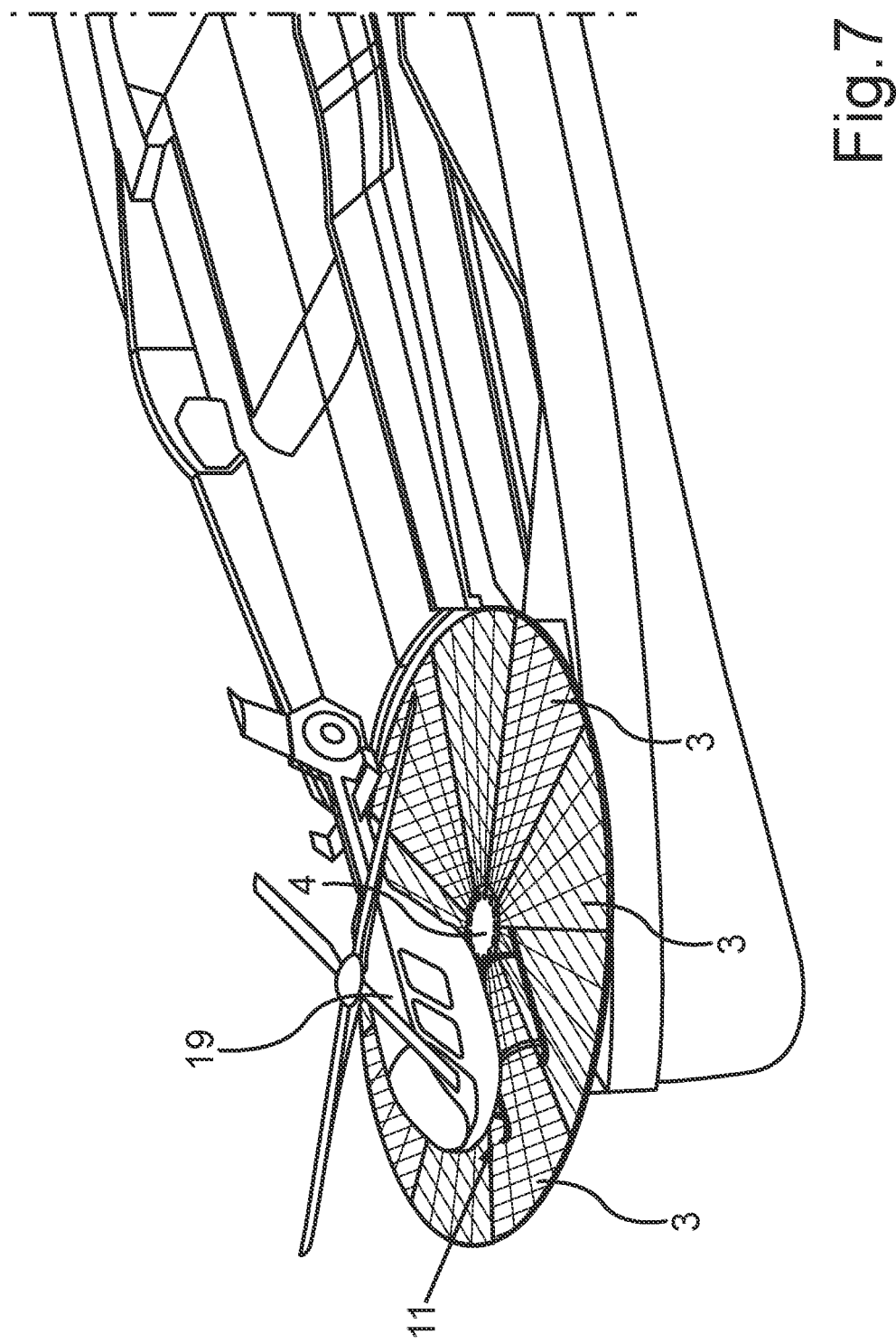
FIG. 7 depicts the landing zone arrangement exemplarily installed on a ship in the operating state in a schematic perspective view.

Finally, FIGS. 6 and 7 show an exemplary arrangement of the landing zone arrangement 1 with a ship as an exemplary installation site. Therein, FIG. 6 shows the landing zone arrangement 1 in the stored state and FIG. 7 shows the landing zone arrangement 1 in the operating state. As FIG. 7 further shows, a surface of the rotor element 4 is also part of the landing zone. In other words, the surface of the rotor element 4 can also contribute to the landing zone 11 in addition to the segments 3.

Based on FIG. 6, it is well apparent that one of the segments 3 is larger than the remaining ones of the segments 3. It is the segment differing from the remaining segments 3, which was already described above. In the present example, it is designed as a cover segment 16. The cover segment 16 is formed to seal the storage space 2 towards the top, in particular in water-proof manner, in the stored state. Hereto, the cover segment 16 rests on the lateral surfaces 6 in the present example, which laterally bound the storage space 2. Hereby, a particularly secure storage of the segments 3 arranged within the storage space 2 is ensured. By the larger dimensions of the cover segment 16, it can be that it protrudes beyond one or more of the segments 3 adjoining in the operating state. In this case, a step can arise here, but which is negligible in practice.

LIST OF REFERENCE CHARACTERS 1 landing zone arrangement
2 storage space
3 segment
4 rotor element
5 base
6 lateral surface
7 support arm
8 securing unit
9 lifting unit
10 lifting element
11 landing zone
12 locking means
14 support element
15 control unit
16 cover segment
17 horizontal direction of movement
18 vertical direction of movement
19 aircraft
20 rotation
21 hook-in movement
22 segment
23 segment
S1-S4 method steps

What is claimed is:

1. A landing zone arrangement for aircraft capable of vertical takeoff, comprising:
    multiple segments, which together form a landing zone in an operating state;
    a storage space, in which the multiple segments are at least partially stowable in a stored state;
    a base with a rotatable rotor element to rotate the multiple segments for transferring into the operating state and/or into the stored state,
    wherein at least individual ones of the multiple segments are removably attached to the rotor element and a securing unit of the landing zone arrangement is formed to attach the removable segments to the rotor element in transferring into the operating state and to detach this attachment in transferring into the stored state; and
    a lifting unit, which comprises one or more lifting elements arranged in or at the storage space, to move the removable segments towards the rotor element in transferring into the operating state.

2. The landing zone arrangement according to claim 1, wherein the rotor element is immovable in relation to the storage space parallel to a rotational axis of the rotor element and in a vertical direction.

3. The landing zone arrangement according to claim 1, wherein, the securing unit comprises at least one pocket for receiving the removable segments at the rotor element.

4. The landing zone arrangement according to claim 1, wherein the segments comprise respective locking means to detachably connect the multiple segments to each other in the operating state.

5. The landing zone arrangement according to claim 1, wherein only one segment of the multiple segments is fixedly arranged at the rotor element.

6. The landing zone arrangement according to claim 5, wherein the only one segment fixedly arranged at the rotor element is designed larger than the removable segments and is formed to cover the storage space to protect the removable segments from weather effects.

7. The landing zone arrangement according to claim 1, wherein support arms are arranged at the base to support the landing zone.

8. The landing zone arrangement according to claim 7, wherein the support arms comprise a vertically extendable support element at their respective end facing away from the base.

9. The landing zone arrangement according to claim 7, wherein at least one of the support arms forms a lateral surface of the storage space and/or seals it in the stored state to ensure that an interior of the storage space is protected from weather effects.

10. The landing zone arrangement according to claim 1, wherein the multiple segments are at least substantially shaped according to a circular sector or a triangle.

11. A method for operating a landing zone arrangement with the following steps for transferring the landing zone arrangement from a stored state into an operating state:

moving multiple removable segments stored in a storage space of the landing zone arrangement towards a rotor element of the landing zone arrangement by means of a lifting unit, which comprises one or more lifting elements arranged in or at the storage space;

attaching the multiple removable segments stored in the storage space of the landing zone arrangement to the rotor element of the landing zone arrangement; and expanding the multiple removable segments by rotating the rotor element.

12. The method according to claim 11, wherein the step of attaching the multiple removable segments includes individually attaching each of the multiple segments one after the other and rotating the rotor element by a predetermined angle before attaching a segment to be subsequently attached.

13. The method according to claim 11, further comprising:

transferring the landing zone arrangement from the operating state into the stored state by
collapsing the multiple removable segments by rotating the rotor element,
detaching the multiple removable segments from the rotor element, and
moving the multiple removable segments by means of the lifting unit into the storage space of the landing zone arrangement.

* * * * *